Dec. 15, 1936.  G. A. LUBURG ET AL  2,064,674
FLEXIBLE FLOTATION GEAR
Filed April 6, 1935  2 Sheets-Sheet 1
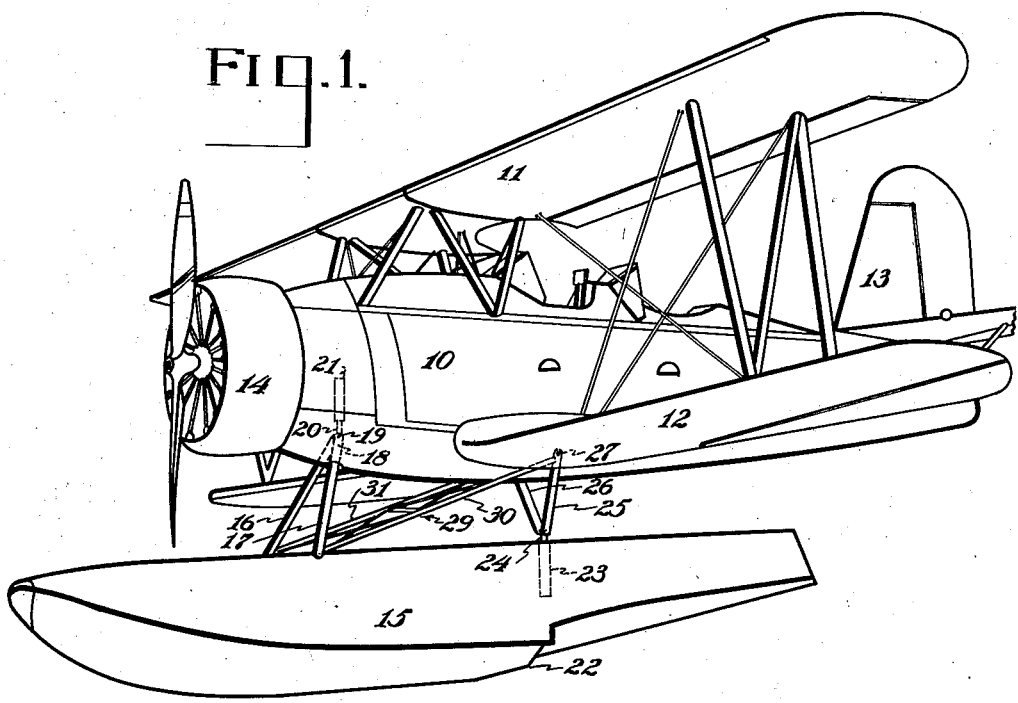
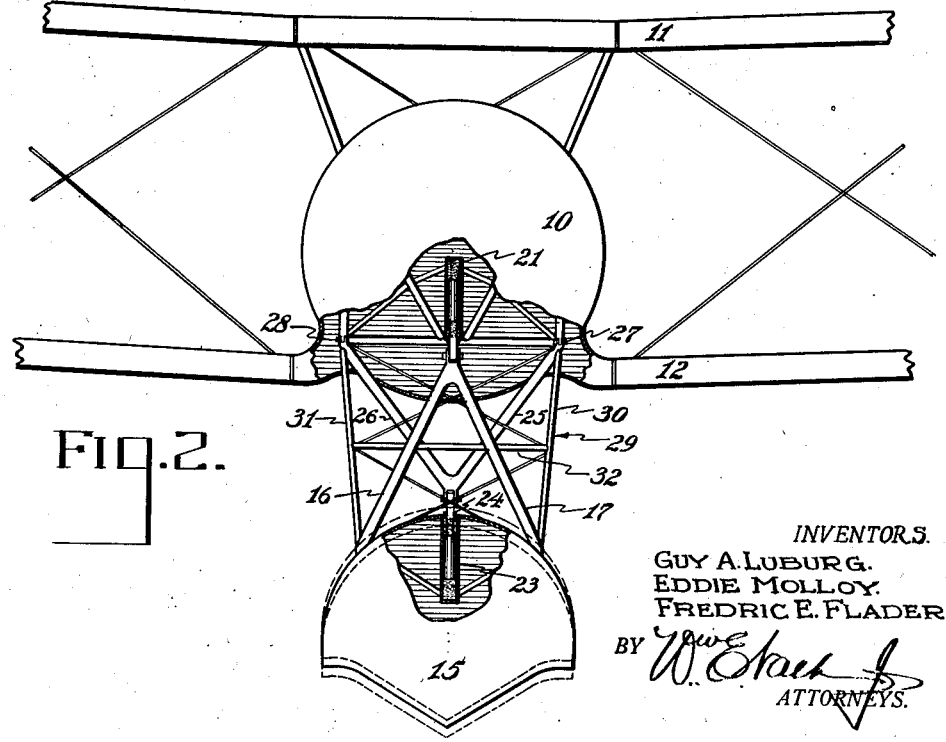
INVENTORS.
GUY A. LUBURG.
EDDIE MOLLOY.
FREDRIC E. FLADER.
BY
ATTORNEYS.

Dec. 15, 1936.  G. A. LUBURG ET AL  2,064,674
FLEXIBLE FLOTATION GEAR
Filed April 6, 1935  2 Sheets-Sheet 2

INVENTORS.
GUY A. LUBURG.
EDDIE MOLLOY.
FREDRIC E. FLADER.
BY
ATTORNEYS.

Patented Dec. 15, 1936

2,064,674

UNITED STATES PATENT OFFICE 2,064,674

FLEXIBLE FLOTATION GEAR

Guy A. Luburg, Snyder, Eddie Molloy, Buffalo, and Fredric E. Flader, Kenmore, N. Y., assignors, by mesne assignments, to Curtiss-Wright Corporation, a corporation of New York Application April 6, 1935, Serial No. 14,966

8 Claims. (Cl. 244—105)

This invention relates to improvements in aircraft landing gears, and particularly relates to flexible mountings for airplane floats on aircraft.

An object of this invention is to provide means for flexibly mounting a pontoon with respect to an aircraft body.

A further object is to so arrange the mounting that the pontoon may tilt with respect to the aircraft axis by which take-off or landing shocks are adequately absorbed.

A further object is to provide means by which the float may move bodily, while maintaining its parallelism or original relationship with the aircraft, closer to or farther from said aircraft.

Still another object is to provide means by which the float may rock through limited angles with respect to the aircraft.

A further object is to provide a mount combining the three movements enumerated above, namely, rocking, tilting and bodily movement.

Although there have been disclosures in the prior art of flexibly mounted aircraft floats, it has been customary in the construction of conventional seaplanes, to mount the floats rigidly with respect thereto, and the float design has been so arranged, by the use of V-bottoms, that the shock of take-off and landing at high speed has been largely absorbed by virtue of the shape of the bottom. However, with seaplanes being built for greater speeds, it becomes difficult to so design the bottom that adequate shock absorption is attained, since the impact of a float body on the water at high speed, regardless of the shape of the float body, approaches the effect of the water being absolutely solid, rather than displaceable, and the bottom of the float, and the pontoon construction generally must then become exceedingly strong, with consequent weight increases, in order to withstand the loads to which it is subjected. Thus, it becomes apparent that flexible mounting of the float is desirable. Since the landing and take-off attitudes of an aircraft on the water may vary as between nose-up and nose-down positions, the point of impact of the pontoon with the water may, according to the landing being effected, be well forward, central or well aft on the pontoon. The maximum stresses will be localized for a brief period at the point of impact, and to relieve these stresses it becomes desirable to permit vertical oscillation of the pontoon with respect to the aircraft body by which the pontoon may yield when it strikes the water to alleviate the local stresses. Our invention provides, then, means by which the float is yieldably mounted on the aircraft and by which longitudinal tilting of the float is permitted with respect to the aircraft. If the point of impact of the pontoon with the water is relatively central, it becomes desirable to permit the whole pontoon to move bodily with respect to the aircraft, and the flexible mounting of our invention permits of such bodily movement in addition to tilting. Should landings be made with the ship not trimmed level laterally, local stresses might be imposed toward one chine or the other of the pontoon, making lateral rocking of the pontoon desirable, and in one embodiment of the invention we provide for this. This lateral rocking, however, would induce less stress in the pontoon structure than the other forces previously mentioned, so at times it may be deemed unnecessary to provide for this. The effect of waves, while the aircraft is on the water, might also have an influence on the provision of rocking arrangements in the pontoon mounting.

Additional objects will become apparent in reading the specification and claims, and in viewing the drawings, in which:

Fig. 1 is a perspective view of an aircraft including one embodiment of the invention;

Fig. 2 is a front elevation, partly broken away, of the embodiment of Fig. 1 showing the structural arrangement involved;

Figure 3:
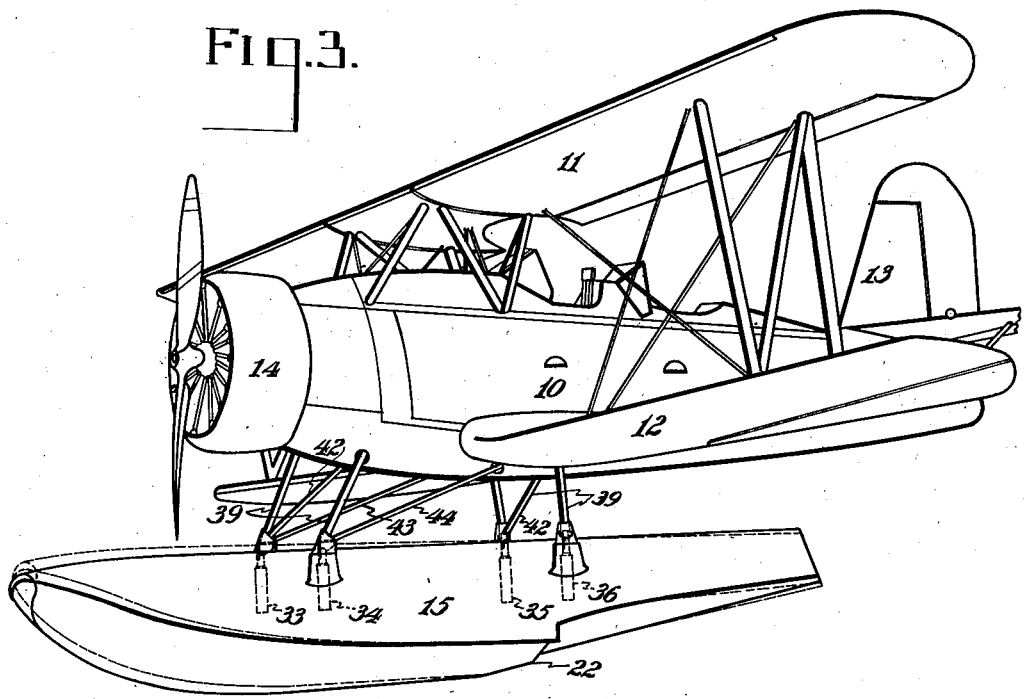
Fig. 3 is a perspective view of an aircraft including a second embodiment of the invention.

In the figures, similar elements in both embodiments will be designated by similar numbers. The airplane includes the usual fuselage 10, wings 11 and 12, empennage 13 and tractor power plant 14. Below the fuselage, in spaced relation thereto, a pontoon or float 15 is mounted. Although we show airplanes embodying a single float, it is within the purview of this invention to provide twin floats. It will likewise be assumed that in the embodiments shown, wing tip floats, which are old in the art, may be utilized.

Referring particularly to Figs. 1 and 2, we provide a pair of forward struts 16 and 17 pivoted at their lower ends in laterally spaced relationship to the upper deck of the float 15, these struts 16 and 17 converging upwardly to a fitting 18 pivoted at 19 to a movable element 20 of a shock absorber 21, the housing of which is fixed within the fuselage 10. It will be noted that these struts are arranged well forward of the float step 22.

Rearwardly of the float step, a shock absorber 23 is mounted within the pontoon structure and is centrally disposed in the plane of symmetry thereof. A movable element 24 of the shock absorber projects above the float deck and has pivoted thereto a pair of struts 25 and 26 which diverge upwardly to pivotal connections 27 and 28 with the aircraft fuselage 10. Thus far, it will be seen that the shock absorbers 21 and 23, which are constructed for a limited movement, will permit the float to move bodily upward and downward with respect to the fuselage, and will permit the float to tilt longitudinally with respect to the fuselage by the deflection of one shock absorber to a greater extent than the other. In order to locate the float in the correct longitudinal position with respect to the aircraft, a diagonal radius frame 29 is provided, this frame comprising a pair of struts 30 and 31, the strut 30 being pivoted at its rearward end adjacent the pivot 27, and at its forward lower end adjacent the point of juncture of the strut 17 with the float 15. Similarly, the rearward end of the member 31 is pivoted adjacent the pivot 28, and the forward lower end thereof is pivoted adjacent the point of juncture of the strut 16 with the float. Interbracing 32 may be provided between the struts 30 and 31 to stiffen the assembly. In operation, should the forward end of the float 15 tend to tip up, the shock absorber 21 will deflect and the float will tend to swing about the pivots 27 and 28. Should the point of float impact be rearward of the step 22, the shock absorber 23 will deflect and the float will tend to move about the forward ends of the struts 30 and 31. Should the point of impact be central, in the neighborhood of the step 22, both shock absorbers 21 and 23 will deflect and the float will move bodily closer to the fuselage 10.

Figure 4:
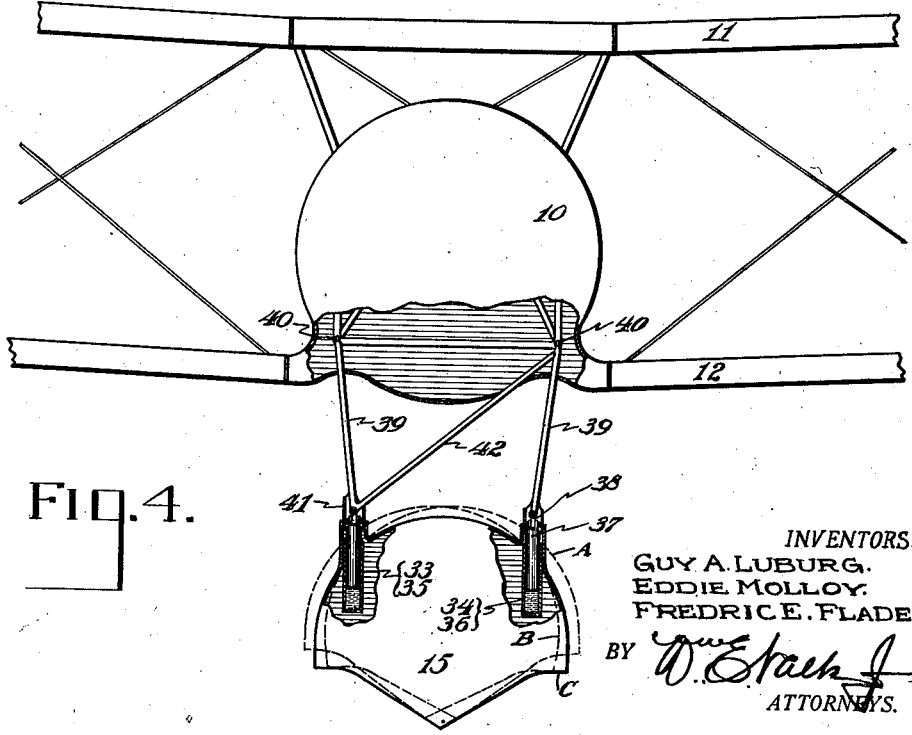
Fig. 4 is a front elevation of the aircraft of Fig. 3 showing the details of pontoon mounting.

In Figs. 3 and 4 we provide a plurality of shock absorber struts 33, 34, 35, and 36, each mounted in the deck of the float 15, the several shock absorbers being quadrilateral in plan. Each shock absorber includes a plunger or movable member 37 equipped with a universal connection 38 forming a point of attachment for a substantially vertical strut 39 extending upwardly to a pivotal connection 40 with the fuselage frame. Waterproof boots 41 may be arranged around the joints 38 to prevent the entry of water into the shock absorber mechanism, and conceivably within the float. A diagonal strut 42 extends from the lower end of one strut 39 of a laterally aligned pair to the upper end of the other strut, by which the strut structure is prevented from lateral movement, but is permitted a certain amount of fore and aft swinging. However, since the shock absorber units 33 to 36, inclusive, are independently mounted, the float may rock laterally to the position A or B from the central position C, as indicated in Fig. 4. Longitudinal displacement of the float 15 with respect to the fuselage 10 is limited by means of independent radius struts 43 and 44, the lower forward end of the strut 43 being pivoted adjacent the joint 38 of the shock absorber 33, and at its upper end to the fuselage adjacent the corresponding longitudinally aligned joint of the strut 39. Similarly, the strut 44 is pivoted adjacent the joint 38 of the shock absorber 34 and extends upwardly and rearwardly to the fuselage joint of that strut emanating from the shock absorber 36.

Under tilting influence of the float, the radius struts 43 and 44 will be twisted relative to each other. Under the influence of longitudinal tilting, the radius struts 43 and 44 control the longitudinal displacement of the float relative to the fuselage, and permit the same degree of relative movement of the float as obtained in the embodiment of Figs. 1 and 2. Thus, the solid line position in Fig. 4 shows the normal float position, and the dotted line float contour shows a position which the float may assume upon nose impact, by which the float is tilted longitudinally upwardly with respect to the fuselage. Similarly, should impact on the float be directed rearwardly thereof, the float would tend to move nose down with respect to the fuselage. By the forward and downward slant of the radius struts in both embodiments of the float mounting, the float is caused to move forward when it is deflected by impact with the water. This has the effect of advancing the flotation center with respect to the aircraft center of gravity, with consequent minimization of a nosing over tendency of the aircraft in a hard landing or a nose-down landing.

By the above construction, we provide resilient float mounting for the major landing positions to which a seaplane may be subjected. It may be found most desirable to utilize the embodiment shown in Figs. 1 and 2 in case a twin float installation is made, since the bodily movement of one float with respect to the aircraft would accomplish a somewhat similar result to rocking of the single float shown in Figs. 3 and 4, in compensating for laterally tilted landings or take-offs.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In a flexible mounting for a float spaced below an aircraft body, a forwardly located vertically acting shock absorber having a movable portion, adjacent said body, struts jointed to said movable portion and diverging laterally downward, the lower ends of said struts having jointed connections with said float, a second rearwardly located vertically acting shock absorber having a movable portion, adjacent said float, struts jointed to said movable portion and diverging laterally upward, the upper ends of the last said struts having jointed connections with said body, and radius rods extending, one on each side of the plane of symmetry, from the float joint of one said forward strut to the body joint of one said rearward strut.

2. In a flexible mounting for a float body spaced below an aircraft body, a forwardly located vertically acting shock absorber having a movable portion, adjacent one said body, a forwardly located substantially vertical strut articulating said shock absorber to said other body, a second rearwardly located vertically acting shock absorber having a movable portion, adjacent the other said body, a rearwardly located vertical strut articulating said shock absorber to the said one body, and a radius strut articulated to one said body adjacent said forward strut and to the other said body adjacent said rearward strut.

3. In a flexible mounting for two elongated aircraft bodies spaced from one another and subject to relative movement, longitudinally spaced resilient means, one adjacent one said body and the other adjacent the other said body, means connecting each said resilient means to the opposite body, and a radius rod articulated at one end to one said body opposite said forward resilient means and articulated at its other end to the other said body opposite said rearward resilient means.

4. In a flexible mounting for a float body spaced below an aircraft body, a shock absorber, having a movable element, adjacent one said body, struts articulated to said movable element extending to laterally spaced points on said other body, a second shock absorber longitudinally spaced from the first, having a movable element, adjacent said other body, and struts articulated to said last mentioned movable element extending to laterally spaced points on said one body.

5. In a flexible mounting for a float body spaced below an aircraft body, a shock absorber, having a movable element, adjacent one said body, struts articulated to said movable element extending to laterally spaced points on said other body, a second shock absorber longitudinally spaced from the first, having a movable element, adjacent said other body, struts articulated to said last mentioned movable element extending to laterally spaced points on said one body, and diagonal struts connecting the forward and rearward laterally spaced body points on each side of the float plane of symmetry.

6. In a mounting for a float body spaced below an aircraft body, a pair of longitudinally spaced V-struts, one having its apex attached to one said body and its spaced ends attached to laterally spaced apart points on the other said body, and the other V-strut having its apex attached to the other said body and its ends attached to laterally spaced apart points on the one said body, and a shock absorber in the connection between each V-strut apex and the adjacent body.

7. In a flexible mounting for two elongated aircraft bodies, a shock absorber adjacent one said body and a shock absorber longitudinally spaced from the first, adjacent the other said body, and struts connecting the respective shock absorbers with opposite points on the other bodies.

8. In a flexible mounting for two elongated aircraft bodies, a shock absorber adjacent one said body and a shock absorber longitudinally spaced from the first, adjacent the other said body, struts connecting the respective shock absorbers with opposite points on the other bodies, and a diagonal strut connecting the anti-shock absorber ends of said first named struts.

GUY A. LUBURG.
EDDIE MOLLOY.
FREDRIC E. FLADER.